(12) United States Patent
Stein et al.

(10) Patent No.: US 10,084,992 B2
(45) Date of Patent: Sep. 25, 2018

(54) ROAD VERTICAL CONTOUR DETECTION

(71) Applicant: MOBILEYE VISION TECHNOLOGIES LTD., Jerusalem (IL)

(72) Inventors: Gideon Stein, Jerusalem (IL); Amnon Shashua, Mevasseret Zion (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

(21) Appl. No.: 15/794,506

(22) Filed: Oct. 26, 2017

(65) Prior Publication Data

US 2018/0048867 A1 Feb. 15, 2018

Related U.S. Application Data

(63) Continuation of application No. 14/798,575, filed on Jul. 14, 2015, now Pat. No. 9,826,199, which is a continuation of application No. 13/693,713, filed on Dec. 4, 2012, now Pat. No. 9,118,816.

(60) Provisional application No. 61/727,755, filed on Nov. 19, 2012, provisional application No. 61/727,722, filed on Nov. 18, 2012, provisional application No. 61/567,132, filed on Dec. 6, 2011.

(51) Int. Cl.
*H04N 7/18* (2006.01)
*G06K 9/00* (2006.01)
*B60W 40/076* (2012.01)
*G06K 9/46* (2006.01)

(52) U.S. Cl.
CPC ............ *H04N 7/18* (2013.01); *B60W 40/076* (2013.01); *G06K 9/00798* (2013.01); *G06K 9/46* (2013.01); *B60W 2420/42* (2013.01); *B60W 2550/142* (2013.01); *G06K 2009/4666* (2013.01)

(58) Field of Classification Search
CPC ........ H04N 7/18; G06K 9/00798; G06K 9/46; G06K 2009/4666; B60W 40/076; B60W 2420/42; B60W 2550/142
USPC ....... 348/148, 143, 149, 151, 153, 154, 155, 348/169
See application file for complete search history.

(56) References Cited

U.S. PATENT DOCUMENTS

2013/0141580 A1 6/2013 Stien et al.
2014/0161323 A1 6/2014 Livyatan et al.
2017/0280061 A1* 9/2017 Kussel .................. H04N 5/243

FOREIGN PATENT DOCUMENTS

CN 101211471 A 7/2008

* cited by examiner

*Primary Examiner* — Robert Chevalier
(74) *Attorney, Agent, or Firm* — Finnegan, Henderson, Farabow, Garrett & Dunner, LLP

(57) ABSTRACT

Various driver assistance systems mountable in a host vehicle and computerized methods for detecting a vertical deviation of a road surface. The driver assistance system includes a camera operatively connectible to a processor. Multiple consecutive image frames are captured from the camera including a first image of the road and a second image of the road. Based on the host vehicle motion, the second image is warped toward the first image to produce thereby a warped second image. Image points of the road in the first image and corresponding image points of the road in the warped second image are tracked. Optical flow is computed between the warped second image to the first image. The optical flow is compared with an optical flow based on a road surface model to produce a residual optical flow. The vertical deviation is computed from the residual optical flow.

16 Claims, 15 Drawing Sheets

ROAD VERTICAL CONTOUR DETECTION

CROSS REFERENCE TO RELATED APPLICATIONS

This application is a continuation of U.S. application Ser. No. 14/798,575, filed Jul. 14, 2015, which is a continuation of U.S. application Ser. No. 13/693,713, filed Dec. 4, 2012, issued as U.S. Pat. No. 9,118,816, which claims the benefit of priority to U.S. Provisional Application No. 61/567,132, filed Dec. 6, 2011; U.S. Provisional Application No. 61/727,722, filed Nov. 18, 2012; and U.S. Provisional Application No. 61/727,755, filed Nov. 19, 2012. The entire contents of all of the foregoing are hereby incorporated by reference.

BACKGROUND

1. Technical Field

The present invention relates to driver assistance systems and methods to detect the vertical deviation of a contour of a road using a camera.

2. Description of Related Art

During the last few years camera based driver assistance systems (DAS) have been entering the market; including lane departure warning (LDW), automatic high-beam control (AHC), traffic sign recognition (TSR) forward collision warning (FCW) and pedestrian detection.

BRIEF SUMMARY

Various driver assistance systems mountable in a host vehicle and computerized methods are provided for herein for detecting a vertical deviation of a road surface. The methods are performable by a driver assistance system mountable in a host vehicle while the host vehicle is moving. The driver assistance system includes a camera operatively connectible to a processor. Multiple consecutive image frames are captured from the camera including a first image of the road and a second image of the road. Based on the host vehicle motion, the second image is warped toward the first image to produce thereby a warped second image. Image points of the road in the first image and corresponding image points of the road in the warped second image are tracked. Optical flow is computed between the warped second image to the first image. The optical flow is compared with an optical flow based on a planar or bi-quadratic road surface model of the road to produce thereby a residual optical flow. The vertical deviation of the road surface is computed from the residual optical flow.

The driver assistance system is operable while the host vehicle is moving to detect a vertical deviation in contour of a road. A first image frame and a second image frame are captured in the field of view of the camera. Image motion is processed between respective images of the road derived from the first image frame and the second image frame. The vertical contour of the road is estimated using a road surface model of the road and the deviation in the vertical contour is computed from the road surface model. The optical flow may be estimated between multiple first image patches of the road derived from the first image frame and corresponding second image patches of the road derived from the second second image frame. The vertical deviation in the road contour is determined by comparing the optical flow with an optical flow as predicted by the road surface model. The residual optical flow indicates the deviation in vertical contour of the road.

A third image frame may be captured in the field of view of the camera and image motion between respective images of the road may be derived from the third image frame and one or more of the first and second image frames. A multi-frame road surface model may be computed by combining a road profile of the road derived from said road surface model based on said first image frame and said second image frame with said second processing.

The multi-frame road surface model may be mapped from the first and/or second image frames to the third image frame by using a homography between said at least one previous image frame to the third image frame.

Assuming a planar model for the contour of the road, the image motion of the images of the road may be processed by initially warping the second image frame toward the first image frame to produce a warped second image frame. The initial warp may include aligning the second image frame with the first image frame by adjusting for an image shift due to motion of vehicle relative to the road, yaw, pitch and/or roll. The initial warp may include an adjustment for the relative scale change between the second image frame and the first image frame. The relative scale change arises from different distances to the camera.

Multiple image paints may be selected in the first image frame. The image points may be located on the image of the road surface and may be located at points of a fixed grid. For the image points, multiple image patches are located disposed respectively about the image points. The image points may be tracked by correlating the image patches in the first image frame with corresponding image patches in the warped second image frame to produce multiple tracked points. The tracked points are fit to a homography. A refined warp of the warped second image frame toward the first age frame may be performed to correct the initial warp by using the homography and to produce a refinely warped second image frame. Optical flow may be computed between the refinely warped second image frame and the first image frame. The optical flow is compared with a road surface optical flow based on a road surface model. The deviation in vertical contour of the road produces a residual optical flow different from the road surface optical flow as found by the road surface model.

The foregoing and/or other aspects will become apparent from the following detailed description when considered in conjunction with the accompanying drawing figures.

BRIEF DESCRIPTION OF THE DRAWINGS

The invention is herein described, by way of example only, with reference to the accompanying drawings, wherein.

DETAILED DESCRIPTION

Figure 1:
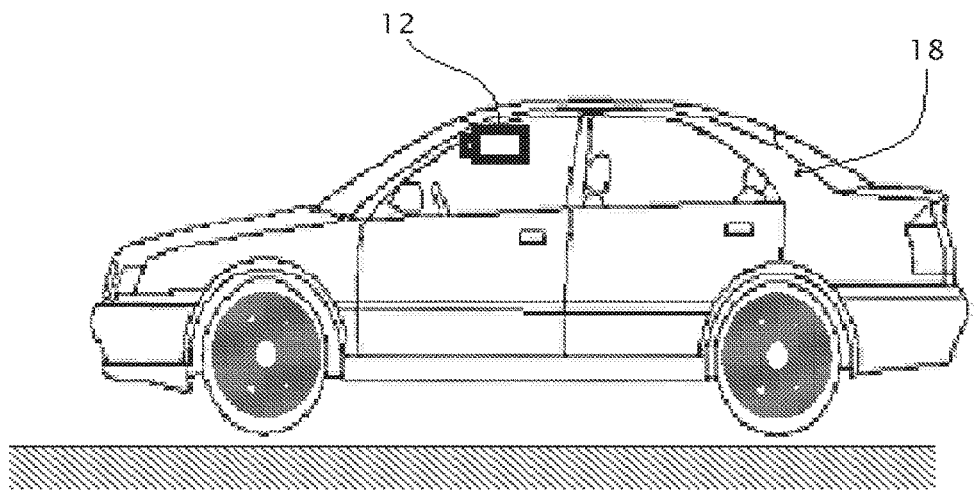
FIGS. 1 and 2 illustrate a system including a camera or image sensor mounted in a vehicle, according to an aspect of the present invention.

Reference will now be made in detail to features of the present invention, examples of which are illustrated in the accompanying drawings, wherein like reference numerals refer to the like elements throughout. The features are described below to explain the present invention by referring to the figures.

Before explaining features of the invention in detail, it is to be understood that the invention is not limited in its application to the details of design and the arrangement of the components set forth in the following description or illustrated in the drawings. The invention is capable of other features or of being practiced or carried out in various ways. Also, it is to be understood that the phraseology and terminology employed herein is for the purpose of description and should not be regarded as limiting.

Figure 2:
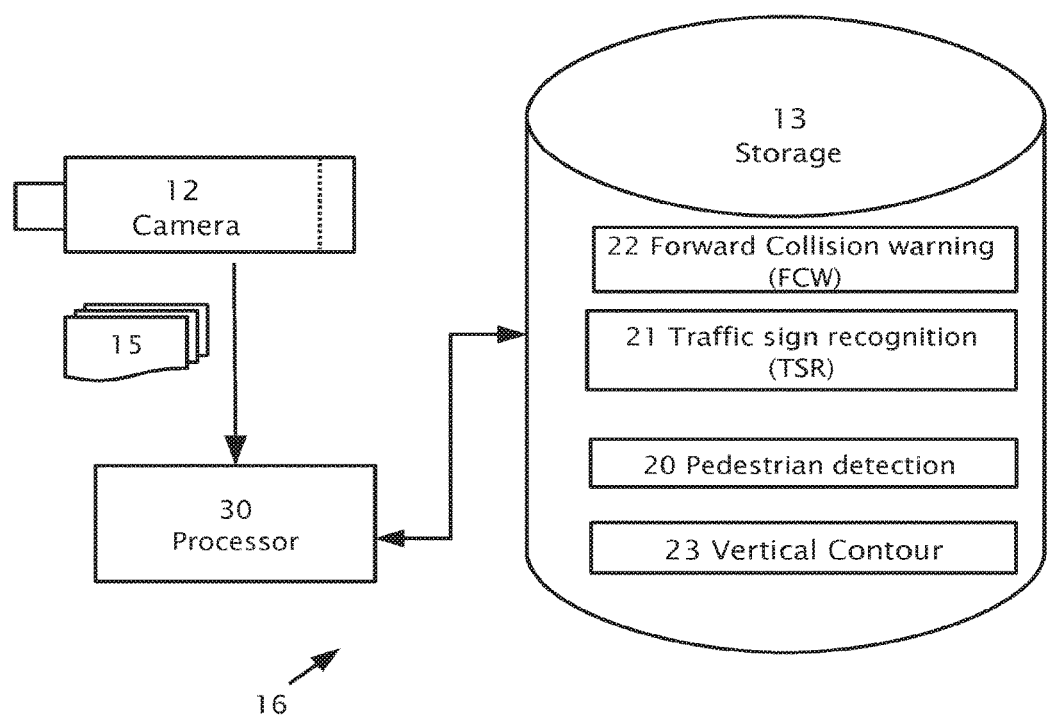

Reference is now made to FIGS. 1 and 2 which illustrate a system 16 including a camera or image sensor 12 mounted in a vehicle 18, according to an aspect of the present invention. Image sensor 12, imaging a field of view in the forward direction provides image frames 15 real time and image frames 15 are captured by an image processor 30. Processor 30 may be used to process image frames 15 simultaneously and/or in parallel to serve a number of driver assistance systems/applications. Processor 30 may be used to process image frames 15 to detect and recognize an image or portions of the image in the forward field of view of camera 12. The driver assistance systems may be implemented using specific hardware circuitry (not shown) with on board software and/or software control algorithms in storage 13. Image sensor 12 may be monochrome or black-white, i.e. without color separation or image sensor 12 may be color sensitive. By way of example in FIG. 2, image frames 15 are used to serve pedestrian detection 20, traffic sign recognition (TSR) 21, forward collision warning (FCW) 22 and real time detection 23 of the vertical contour of the road or deviation from the road plane according to features of the present invention.

In some cases, image frames 15 are partitioned between different driver assistance applications and in other cases the image frames 15 may be shared between the different driver assistance applications.

By way of introduction, various embodiments of the present invention are useful to accurately detect road shape i.e. vertical profile of a road using camera 12 mounted in host vehicle 18. Using systems and methods provided herein, bumps and/or holes such as speed bumps, curbs and manhole covers may be detected with vertical deviations as little as two centimeters from the road plane. System and methods as disclosed herein may be similarly applied to forward viewing, side viewing and rear viewing cameras 12.

Various methods as described herein accurately estimate the planar (or bi-quadratic) model of the road surface and then computes the small deviations from the planar (or bi-quadratic) model to detect bumps and holes.

Figure 3:
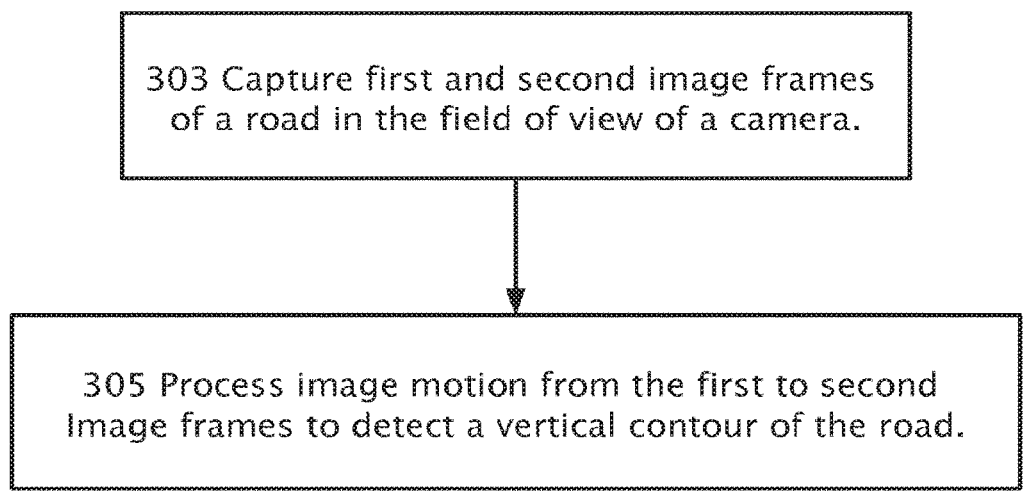
FIG. 3 shows a flow diagram of a simplified method for real time measurement of vertical contour of a road while a vehicle is moving along a road, according to a feature of the present invention.

Reference is now made to FIG. 3 which shows a flow diagram of simplified method 23 for real time measurement of vertical contour of a road while vehicle 18 is moving along a road, according to a feature of the present invention. In step 303, a first image frame 15 and a second image frame 15 are captured of a road in the field of view of camera 12 mounted in vehicle 18. Image motion from first image frame 15 to second image frame 15 is processed (step 305) to detect a vertical deviation of contour of the road. Further details of step 305 are shown in the description that follows.

Figure 4:
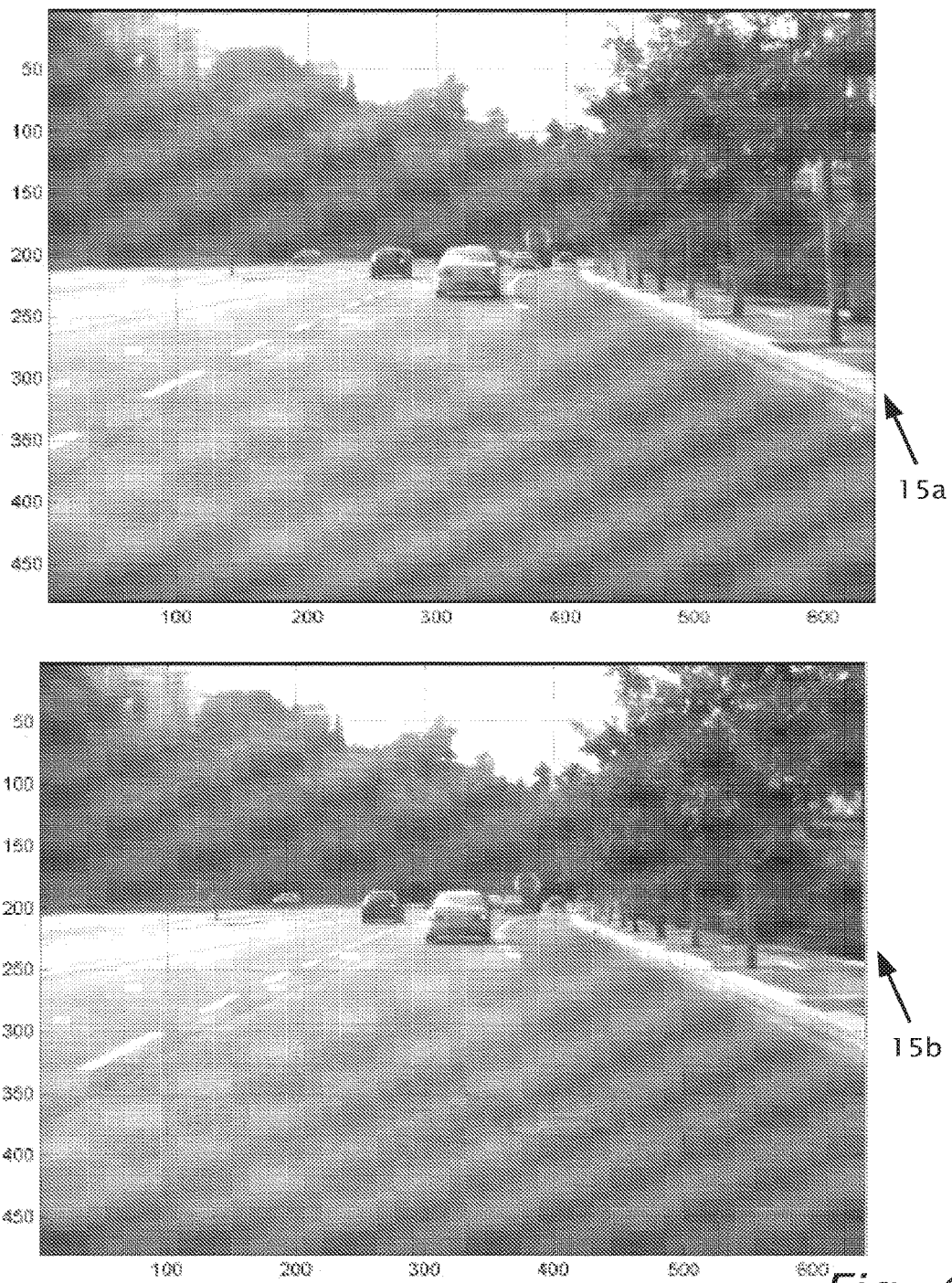
FIG. 4 shows two consecutive image frames captured from a forward looking camera mounted in a vehicle, according to a feature of the present invention.

Reference is now also made to FIG. 4 which shows two consecutive image frames 15a and 15b captured (step 303) from forward looking camera 12 mounted in a vehicle 18, according to a feature of the present invention. Image frame 15b is captured after image frame 15a is captured. Equivalently image frame 15b may be captured prior to capturing image frame 15a Camera 12 in the description that follows may be a WVGA camera (Aptina M9V024 and Sunny 4028A 5.7 mm lens) as used in the Mobileye™ advance warning system (AWS)™.

Figure 5:
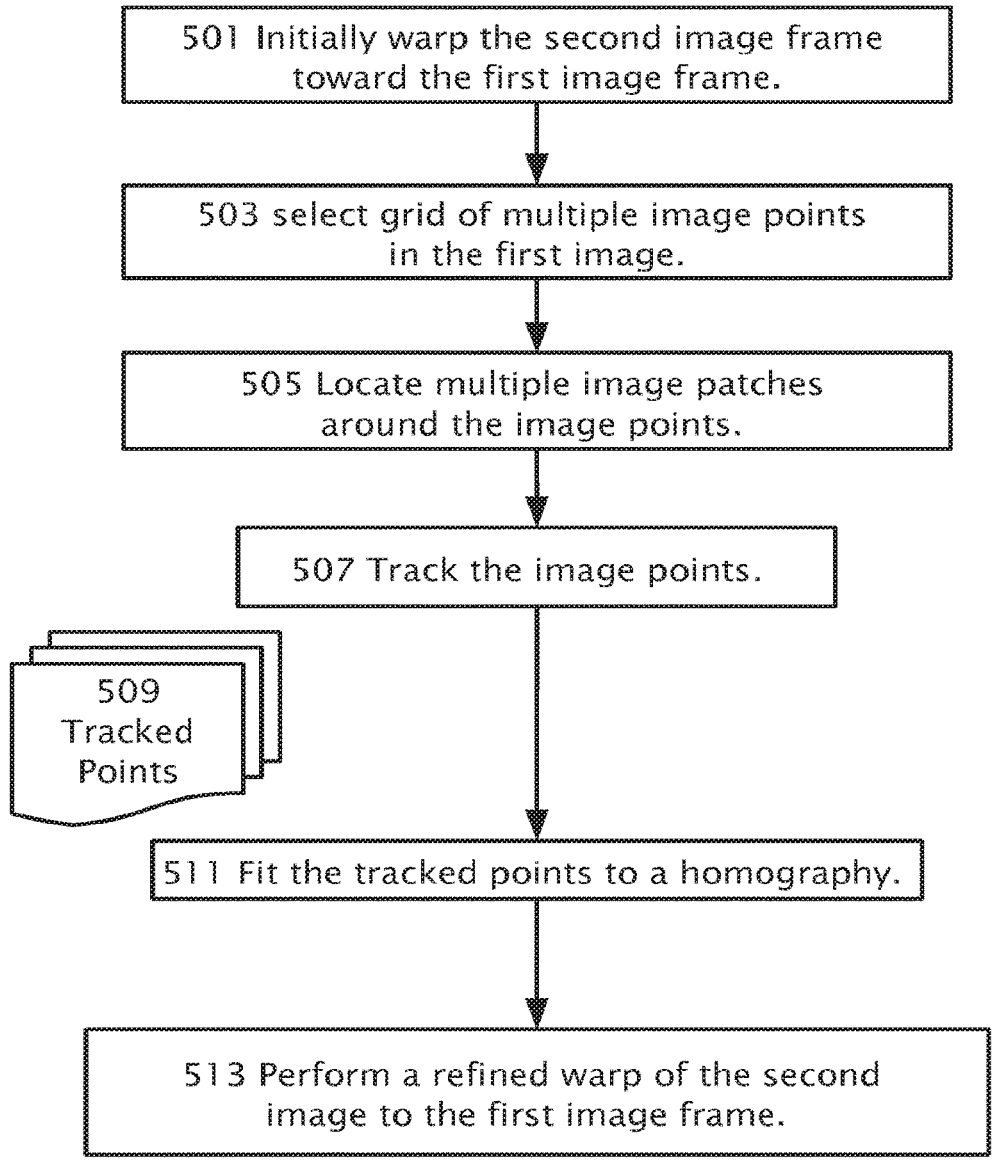
FIG. 5 includes a flow chart showing details of a processing step shown in FIG. 3, according to a feature of the present invention.

Reference is now also made to FIG. 5 which includes a flow chart showing details of processing step 305, according to a feature of the present invention. The term "warping" as used herein refers to a transform from image space to image space.

Image frame 15b is initially warped (step 501) into image frame 15a. (In a similar process, image frame 15a may be initially warped into image frame 15b). It is assumed that a road can be modeled as an almost planar surface. Thus imaged points of the road will move in image space according to a homography. The term "homography" as used herein refers to an invertible transformation from a projective space to itself that maps straight lines to straight lines. In the field of computer vision, two images of the same planar surface in space are related by a homography assuming a pinhole camera model.

In particular, by way of example, for a given camera 12 height (1.25 m), focal length (950 pixels) and vehicle motion between frames (1.58 m), it may be possible to predict the motion of the points on the road plane between the two image frames 15a and 15b respectively. Using a model of the almost planar surface for the motion of the road points, it is possible to warp the second image 15b towards the first image 15a. The following Matlab™ code would perform initial warp step 501:

```
[h,w]=size(Iin);
Iout=zeros(size(Iin));
for i=1:h,
    for j=1:w,
        x=j;
        y=i;
        S=dZ/(f*H);
        x1=x(:)-x0;
        y1=y(:)-y0;
        y2=y1./(1+y1*S);
        x2=x1./(1+y1*S);
        x2=x2+x0;
        y2=y2+y0;
        Iout(i,j)=bilinearInterpolate(Iin,x2,y2);
    end;
end;
``` where dZ is the forward motion of vehicle 18, H is camera 12 height and f is the focal length of camera 12. $p_0=(x_0; y_0)$ is the vanishing point of the road structure. Alternatively, it may be may be possible to use initial calibration values during installation of of system 1 in vehicle 18, where $x_0$ is the forward direction of the vehicle 18 and $y_0$ is the horizon line when vehicle 18 is on a horizontal surface. The variable S is an overall scale factor relating image coordinates between the two image frames 15a and 15b captured at different vehicle distances Z from camera 12. The term "relative scale change" as used herein refers to the overall scale change in image coordinates dependent upon distance Z to camera 12.

Figure 6:
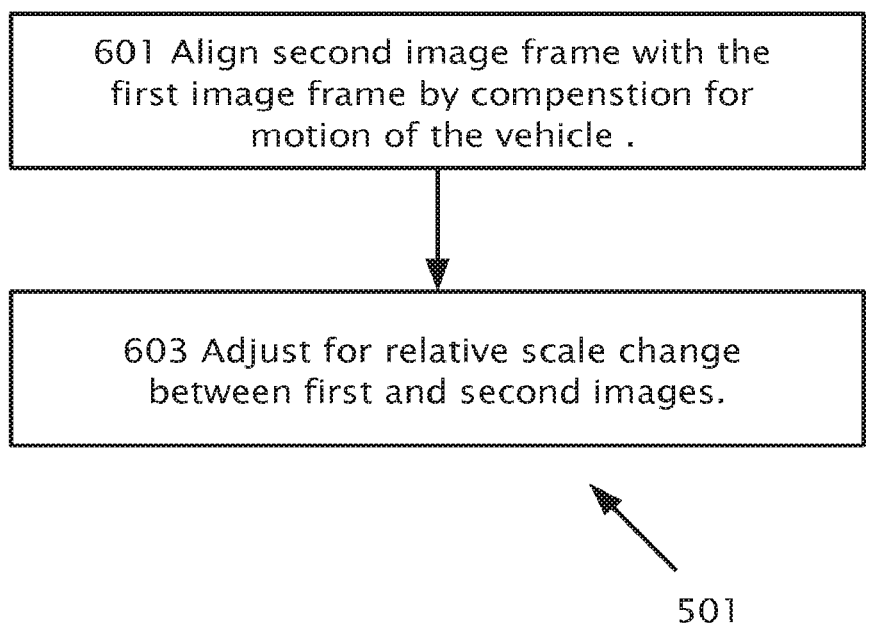
FIG. 6 includes a flow chart illustrating further details of an initial warping step shown in FIG. 5, according to feature of the present invention.

Reference is now made to FIG. 6 which includes flow chart illustrating further details of initial warping step 501, according to feature of the present invention. According to the road model, image 15b is transformed by rotation (step 601) towards image 15a according to an estimate of yaw, pitch and roll that are available. The estimate may come from inertial sensors such as a yaw rate sensor in vehicle 18 or in camera 12 head. The estimate might also come from values computed from previous image frames 15. Initial warping based on planar road plane model in shown in step 603b.

In practice rotation (step 601) and the road model warp (step 603) can be combined into a single warp so only one step of bilinear interpolation is required. If only pitch and yaw are involved these can be approximated by image shifts. For example, yaw can be approximated a horizontal image shift $\delta\theta_{Pixels}$ from equations 1 and 2:

$$\delta\Theta = \delta t \times yawRate; \quad (1)$$

$$\delta\Theta_{Pixels} = \frac{f\delta\Theta * \pi}{180} \quad (2)$$

Figure 7A:
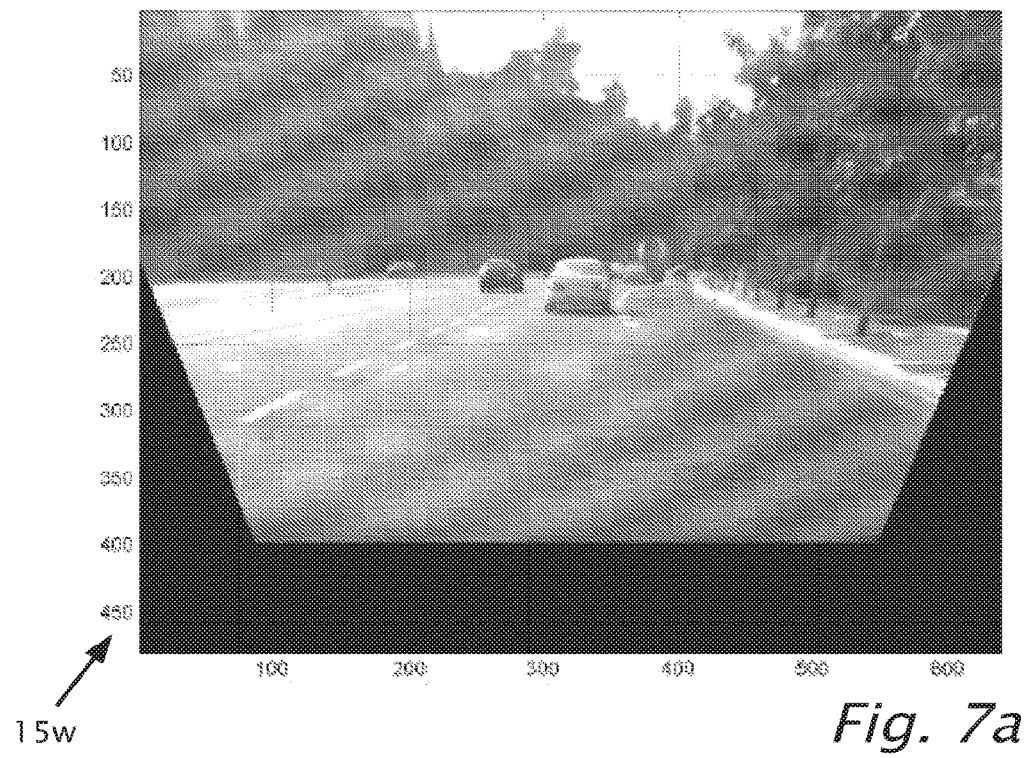
FIG. 7a shows the results of the initial warp step of FIG. 5, the results shown as a warped image, according to a feature of the present invention.

Reference is now made to FIG. 7a which shows the results of the initial warp step 501 of image 15b towards image 15a, the results are shown as warped image 15w, according to a feature of the present invention. The warp may be based on vehicle 18 motion (from the speedometer, inertial sensors etc.).

Figure 7B:
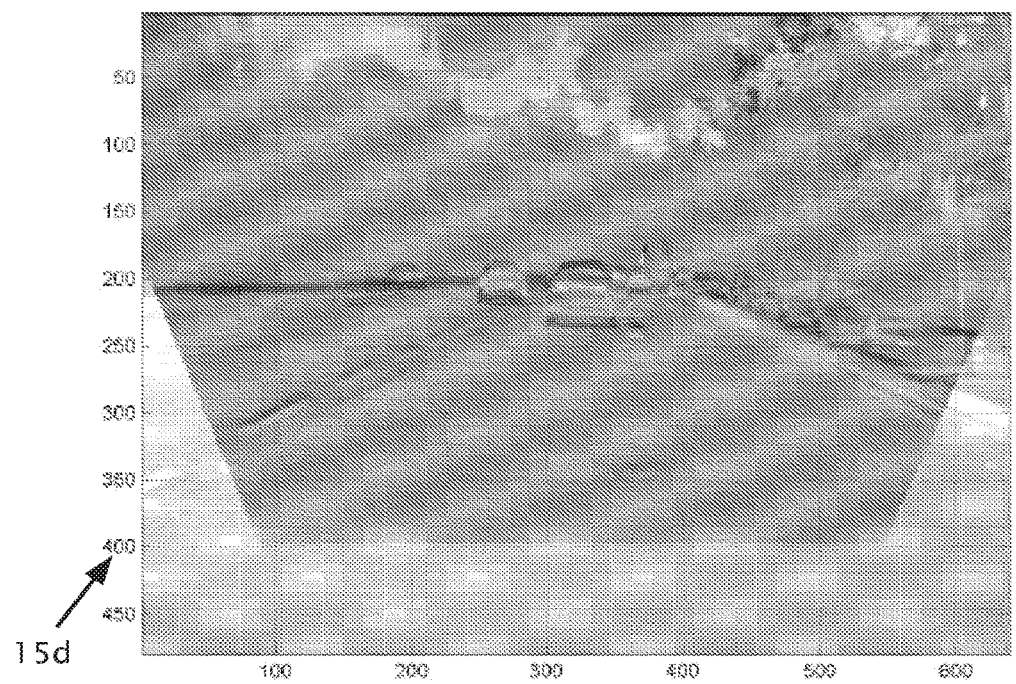
FIG. 7b shows a difference image as a result of the difference between the warped image of FIG. 7a and an image, according to a feature of the present invention.

Reference is now made to FIG. 7b which shows the difference between warped image 15w and image 15a shown as image 15d, according to a feature of the present invention. In FIG. 7b it can be seen that some features on the road are still not perfectly aligned.

Tracking of Points

After initial warp (step 501), the remaining motion of features on the road can be approximated locally, as a uniform translation of an image patch from image 15a to image 15w. This is not true of the motion between the original image 15a and un-warped image 15b, where the motion of a patch also involves a non-uniform scale change.

Figure 8A:
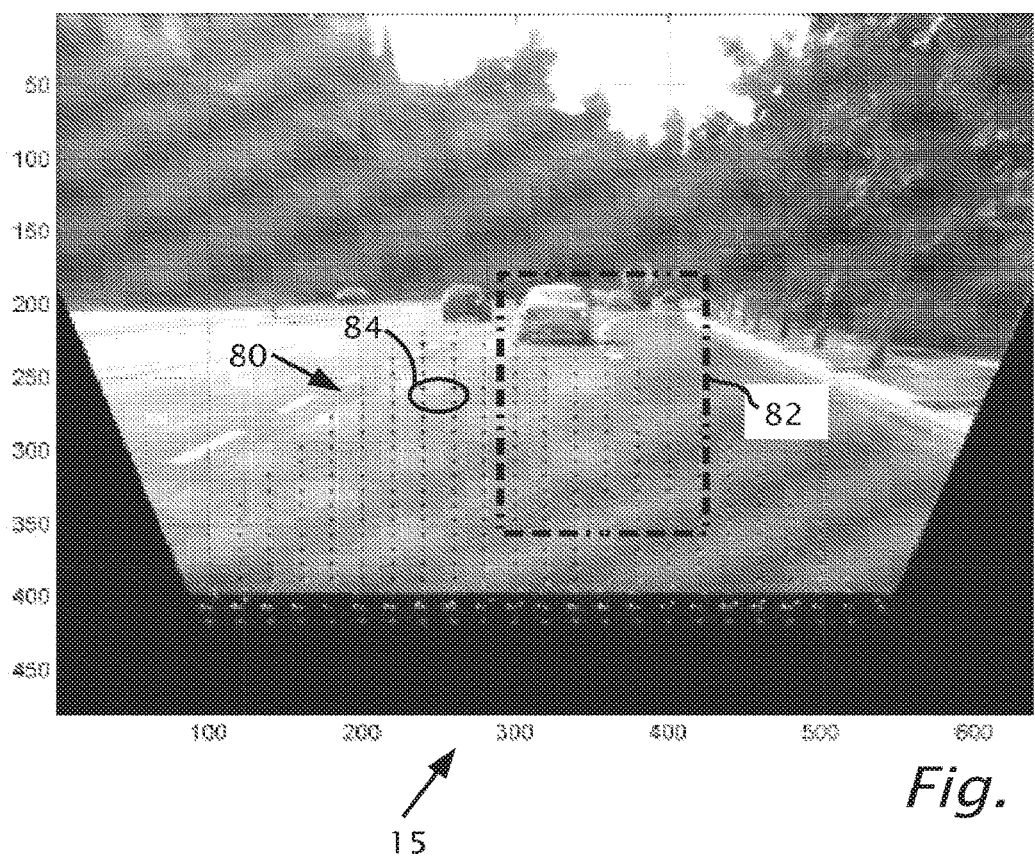
FIG. 8a shows a warped image frame with a trapezoidal region, according to a feature of the present invention.

Reference is now also made to FIG. 8a which shows warped image frame 15w with a trapezoidal region 80, according to a feature of the present invention. Instead of trying to find feature points, which would invariably give a bias towards strong features such as lane marks and shadows, a fixed grid 84 of points is used for tracking (step 507). Grid 84 of points are selected (step 503) from a trapezoidal region 80 that roughly maps to up 15 meters ahead and one lane in width. Points 84 are spaced every 20 pixels in the horizontal direction and 10 pixels in the vertical direction. An alternative would be to randomly select points according to a particular distribution.

Around each point in image 15a a patch is located (step 505). In this case the patch is 8 pixels in each direction centered around the point resulting in a 17×17 pixel square. The normalized correlation is then computed (e.g. Matlab™ function normxcorr2) for warped image 15w, where the patch center is shifted in the search region. In practical use there may be a yaw sensor but no pitch sensors and so a tighter search region is used in the x direction rather than in the y direction. A search region of (2×4+1) pixels in the x direction may be used and (2×10+1) pixels in the y direction.

The shift which gives the maximum correlation score was found and was followed by a refinement search around the best score position with a sub-pixel resolution of 0.1 pixels. This refinement step gave superior results to trying to fit the integer scores around the maximum score to a parabolic surface or spline and using these integer scores around the maximum score to compute a sub-pixel match. The refinement search with a sub-pixel resolution of 0.1 pixels also gave better results than Lukas Kanade flow which minimizes the sum square differences.

Invalid tracks may be filtered out at the search stage by picking those points with a score above a threshold (e.g. T=0.7) leaving tracked points 509 as a result of tracking step 507 and that the reverse tracking from warped image 15w to image 15a gives a similar value in the opposite direction. Reverse tracking is similar to left-right validation in stereo.

Figure 8B:
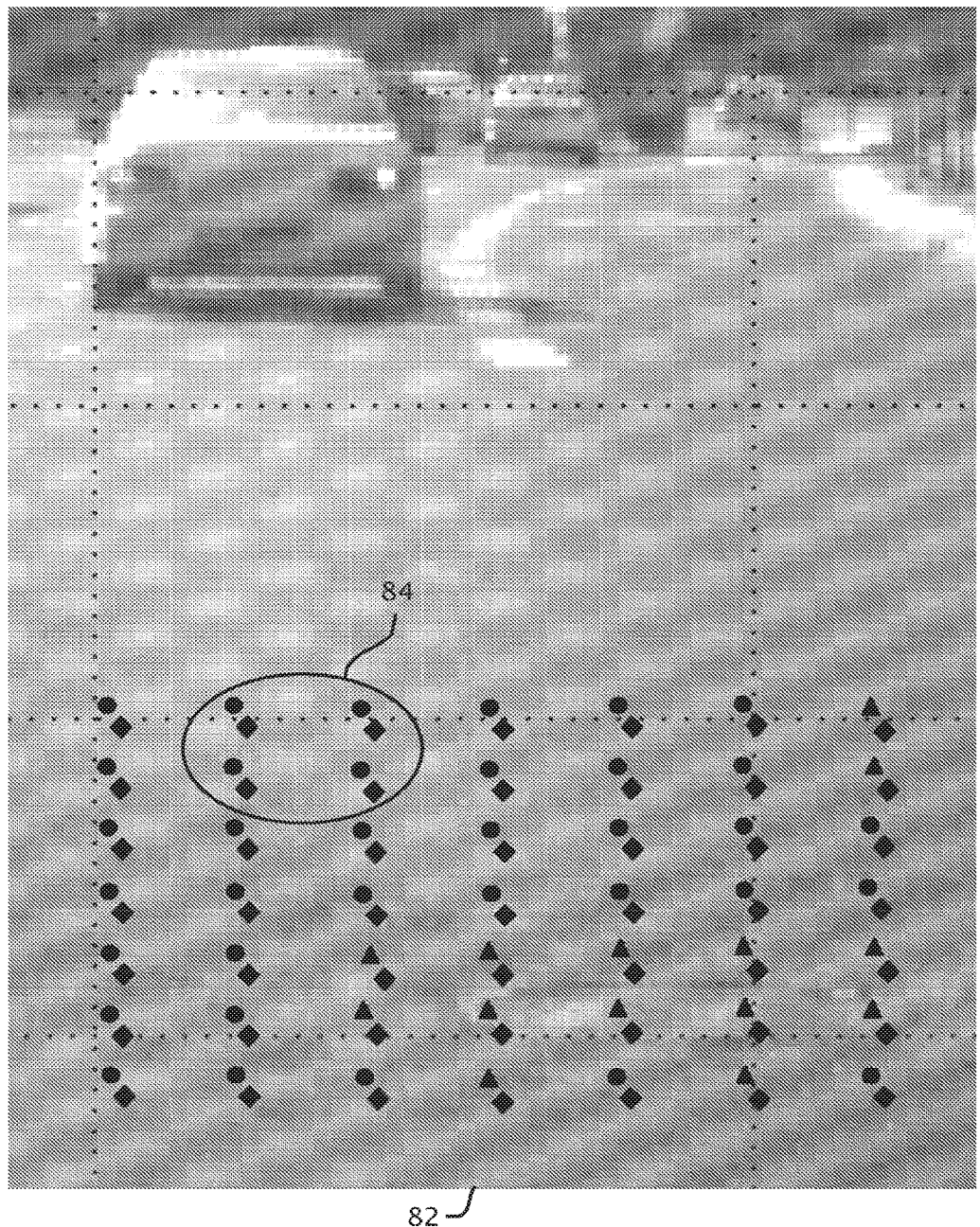
FIG. 8b shows a detail of the trapezoidal region in warped image frame of FIG. 8a, according to a feature of the present invention.

Reference is now also made to FIG. 8b which shows a detail 82 of trapezoidal region 80 in warped image frame 15w, according to a feature of the present invention. Triangle and circle points 84 are the starting location. Diamond points are the corresponding tracked location. Inliers are shown as circles and outliers are shown as triangles.

Robust Fitting

Tracked points 509 as a result of tracking step 507, are fit to a homography (step 511) using RANdom SAmple Consensus (RANSAC). A number, e.g. four, of points are chosen at random and used to compute the homography. Points 509 are then transformed using the homography and the number of points which are closer than a threshold are counted. Randomly choosing 4 points and counting the number of points which are closer than a threshold is repeated many times and the four points that gave the highest count are retained.

At the end of the process, the four best paints are used to again (step 513) transform the points and all the points (inliers) that are closer than a (possibly different) threshold are used to compute a homography using least squares. The rest of the points that are not closer than a (possibly different) threshold are considered outliers.

At this point in the process, the number of inliers and their spread in warped image 15w give an indication to the success of finding the road plane model. It is usual to get over 100 inliers and a good fit. FIG. 8b shows the inliers as circles and outliers as triangles. The homography can then be used to correct the initial alignment warp (step 501). Correction of the initial alignment warp can be done by integrating the correction into the initial warp (step 501) or to do the two warps consecutively. The former is advantageous as it requires only one interpolation step and can be performed optionally by matrix multiplication of the two homography matrices.

Figure 9A:
FIG. 9a shows the results of the refined warp of a warped image towards an image, according to a feature of the present invention.

Reference is now made to FIG. 9a which shows the results of the refined warp of warped image 15w towards image 15a, according to a feature of the present invention. In FIG. 9a, features on the road are almost perfectly aligned. There are however, still some brightness differences that are not accounted for.

Figure 9B:
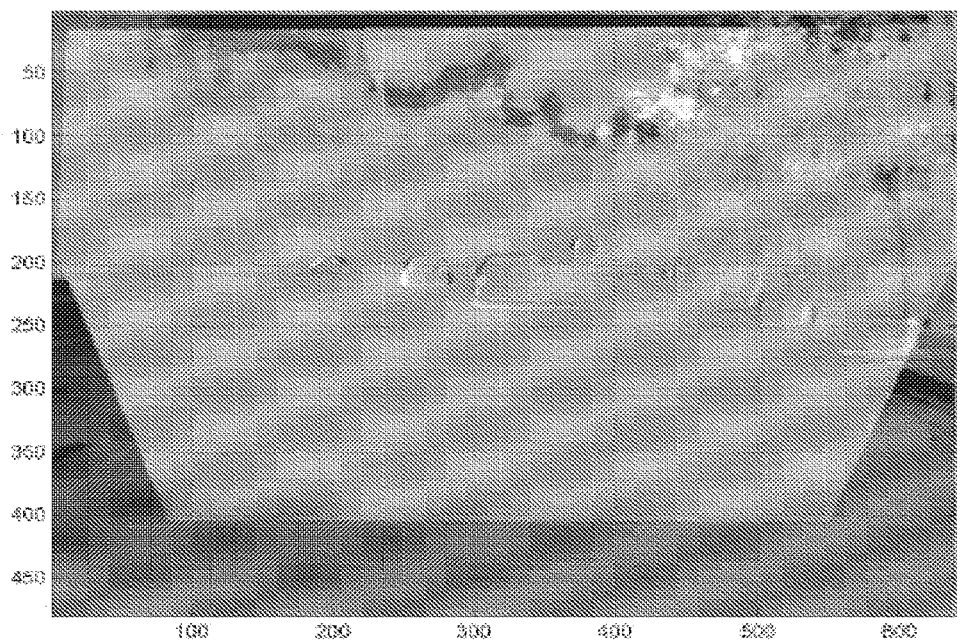
FIG. 9b shows the difference between the refined warp of a warped image towards an image and the image, according to a feature of the present invention.

Reference is now made to FIG. 9b which shows the difference between the refined warp of warped image 15w towards image 15a and image 15a, according to a feature of the present invention.

Dense Tracking and Residual Flow

After warping image 15b towards image 15a to give warped image 15w, using the refined warp (step 513), the tracking of points (step 507) may be repeated using a finer grid (e.g. every 5th pixel on every 5th row) and over a wider region of the road. Since the road plane is very well aligned, a smaller region may be searched over such as 2 pixels in each direction, again, with a subpixel search.

Figure 10A:
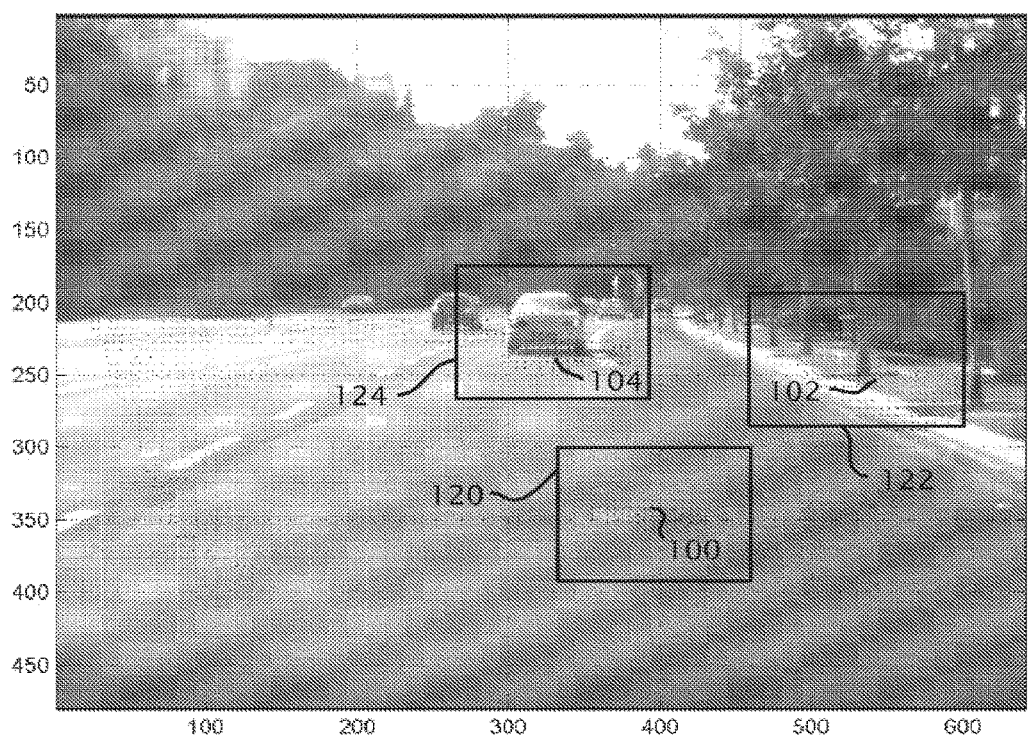
FIG. 10a shows the results of tracking a dense grid of points, according to a feature of the present invention.
Figure 10B:
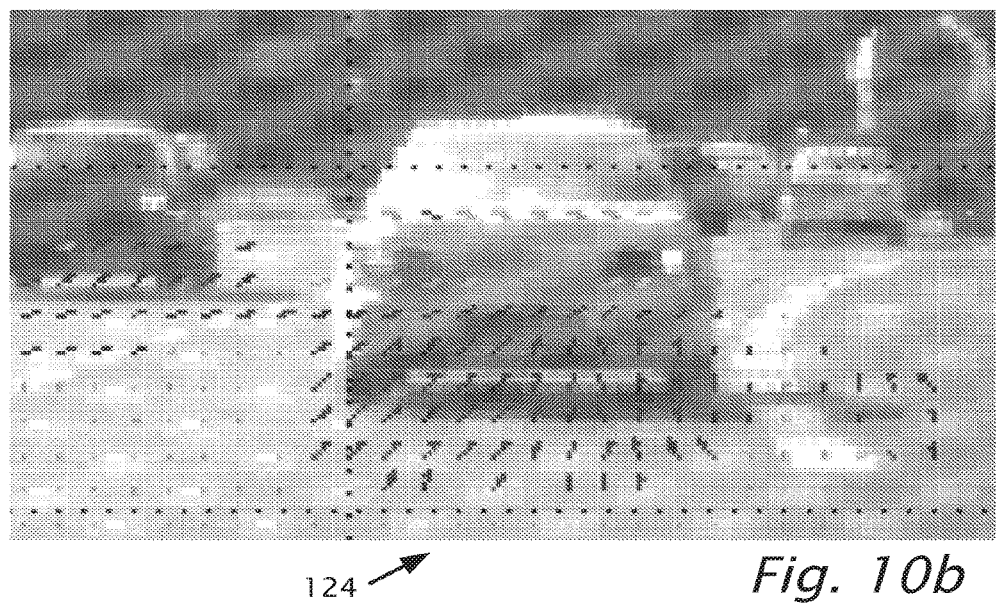
FIGS. 10b, 10c and 10d show details of areas indicated in FIG. 10a, according to a feature of the present invention.
Figure 10C:
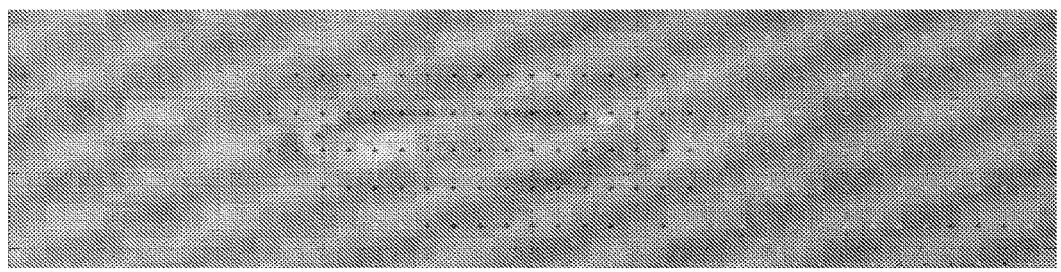
Figure 10D:
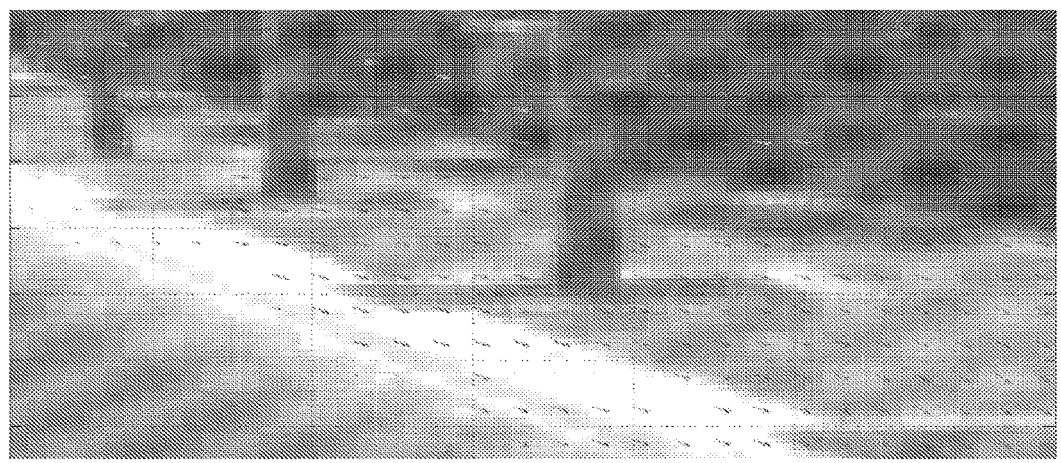

Reference is now made to FIG. 10a which shows the results of tracking a dense grid of points, according to a feature of the present invention. FIG. 10a includes area 124 with a car and shadow 104 on the car. Also areas 120 and 122 which include manhole cover 100 and sidewalk 102 respectively. FIGS. 10b, 10c and 10d show greater details of areas 124, 120 and 122 respectively.

Results are shown in FIGS. 10a-10d as a Matlab™ quiver plot. The Matlab™ quiver plot displays velocity vectors as arrows with components (u,v) at the points (x,y). For example, the first vector is defined by components u(1),v(1) and is displayed at the point x(1),y(1). Quiver(x,y,u,v) plots vectors as arrows at the coordinates specified in each corresponding pair of elements in x and y. Points on the road should exhibit flow close to zero. Points on features above the road plane will have flow greater than zero and points below the road plane will have residual flow below zero. Positive flow is defined as flow away from the focus of expansion (FOE) (generally speaking down and outwards). Note that the elevated sidewalk 102 as shown in FIG. 10d and sunken manhole cover 100 as shown in FIG. 10c both show up well. Objects which are not fixed to the road also show significant residual flow as on the car and the shadow 104 on the car. Points with flow above 0.5 pixels are shown in the elevated sidewalk 102 and points with flow below −0.5 pixels are shown on the sunken manhole cover 100, on the car and the shadow 104 on the car.

Sidewalks can thus be detected by detecting relatively homogenous positive residual flow regions that are separated from areas of low residual flow by elongated lines. These lines are roughly heading in the direction of the FOE or the direction of the road (i.e. the direction of the vanishing points of the lane marks).

Significant robustness to noise can be achieved by combining information from neighboring points (i.e. applying some sort of smoothness constraint) by using global cost functions with variational approaches or by using dynamic programming.

Variational Approaches

As a first, the Horn And Schunk optical flow computation may be applied between image 15a and warped image 15b. (Horn, B. K. P. & B. G. Schunck, "Determining Optical Flow", *Artificial Intelligence*, Vol. 17, No. 1-3, August 1981, pp. 185-203). Since the images are well aligned the algorithm can converge quite well. Horn and Schunk use quadratic error functions for both the data and the error terms. Better results can be obtained using L1 errors terms. The optical flow code of Ce Liu (C. Liu. Beyond pixels: exploring new representations and applications for motion analysis. Doctoral Thesis. Massachusetts Institute of Technology. May 2009. Appendix A pages 143-148) works quite well. The code is by Ce Liu based on the work of Brox et al. (T. Brox, A. Bruhn, N. Papenberg, and J. Weickert. High accuracy optical flow estimation based on a theory for warping. In *European Conference on Computer Vision* (ECCV), pages 25-36, 2004.)

However, some changes are made to the code of Ce Liu. When using the variational approach the computation is restricted to only one level of the pyramid (the nest or original level) for two reasons:

1. Often the texture on the road is very fine and only the texture can be seen in the highest resolution image and not in upper levels of the pyramid. Typically there is no coarse texture on the road so coarse-to-fine does not work.

2. The solution should not be pulled towards the significant, coarse scale brightness features. Otherwise the solution will be pulled away from the well aligned starting point and never recover.

A further term may be added to the cost function which penalizes for straying far from the planar model (i.e. for flow above 1 pixel or some other threshold). The function:

$$\lambda\Sigma(u^2+v^2)^a \quad (3)$$

works well where u and v are the values of the flow in x and y respectively, a determines the shape of the cost term. a=4 works well. λ weights this cost term compared to the data term and the smoothness term.

In order to reduce the effects of brightness changes between images, a bandpass or high pass filtering may be performed. For example:

f=ones(5);
   f=f/sum(f(:));
   f=conv2(f,f);
   f=conv2(f,f);
   f=conv2(f,f);
   im1f=conv2(im1,f,'same');
   im2f=conv2(im2,f,'same');
   im1=im1−im1f;
   im2=im2−im2f;

The optical flow computation may be applied to only the part of the image typically occupied by the road. For example by starting only from the horizon down, remove 100 columns on the left and right and also the bottom part of image 15a which does not appear in warped image 15w (and is zero in the warped image, see FIG. 9a).

Figure 11:
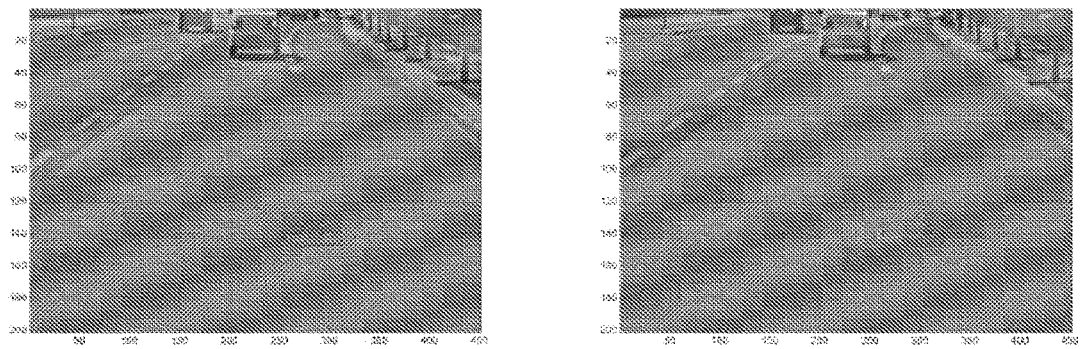
FIG. 11 shows two filtered and cut images that are fed into an optical flow routine executed in Matlab™, according to a feature of the present invention.

In Matlab™ code that is:
im1=im1(200:400,100:540);
im2=im2(200:400,100:540);

Reference is now made to FIG. 11 which shows two filtered and cut images that are fed into the optical flow routine in the Matlab™ codes above, according to a feature of the present invention. The two images filtered and cropped to be used as input to the optical flow routine have the road texture enhanced by the high-pass filtering.

Figure 12:
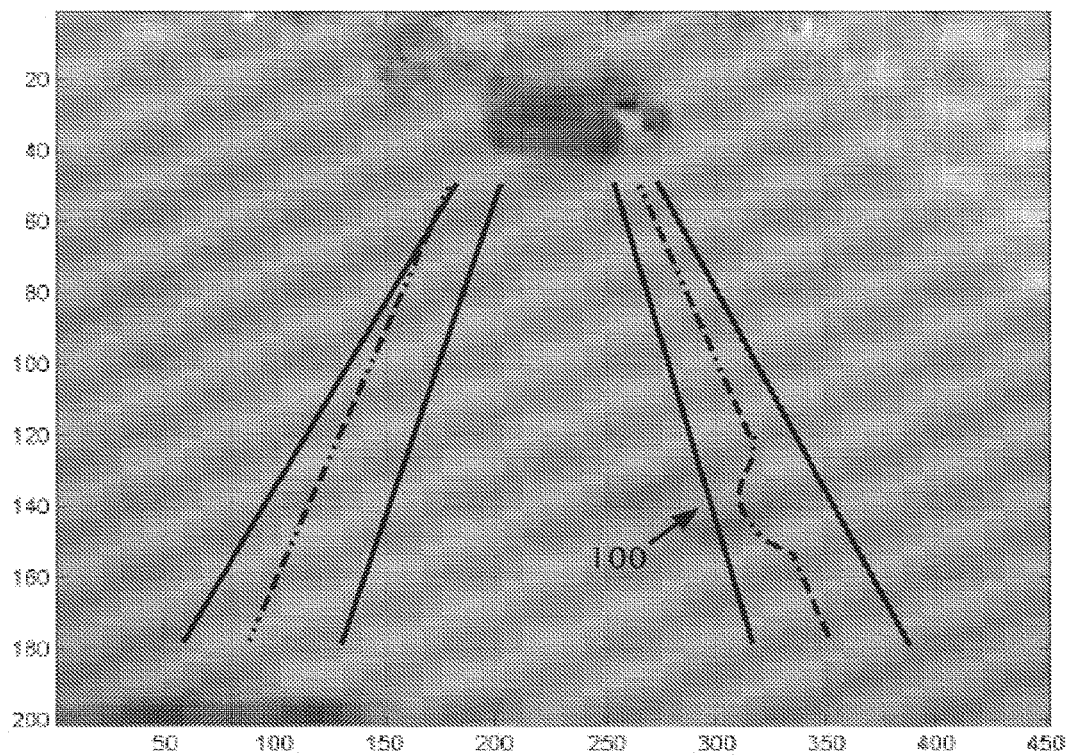
FIG. 12 shows they component of the residual optical flow as a gray scale image, according to a feature of the present invention.

Reference is now made to FIG. 12 which shows the y component of the residual optical flow as a gray scale image, according to a feature of the present invention. Note the dark patch centered around (300,140) on the horizontal and vertical axis respectively. The dark patch is due to the negative residual flow on manhole cover 100 which is sunken in the road. The solid lines indicate tracks 0.5 m wide in front of the host vehicle wheels. The clotted line is the row average of the data between each pair of solid lines. The data is scaled by 30 to make the shape of the data visible. Note the significant dip in the right dotted red line due to the manhole cover 100.

Figure 13:
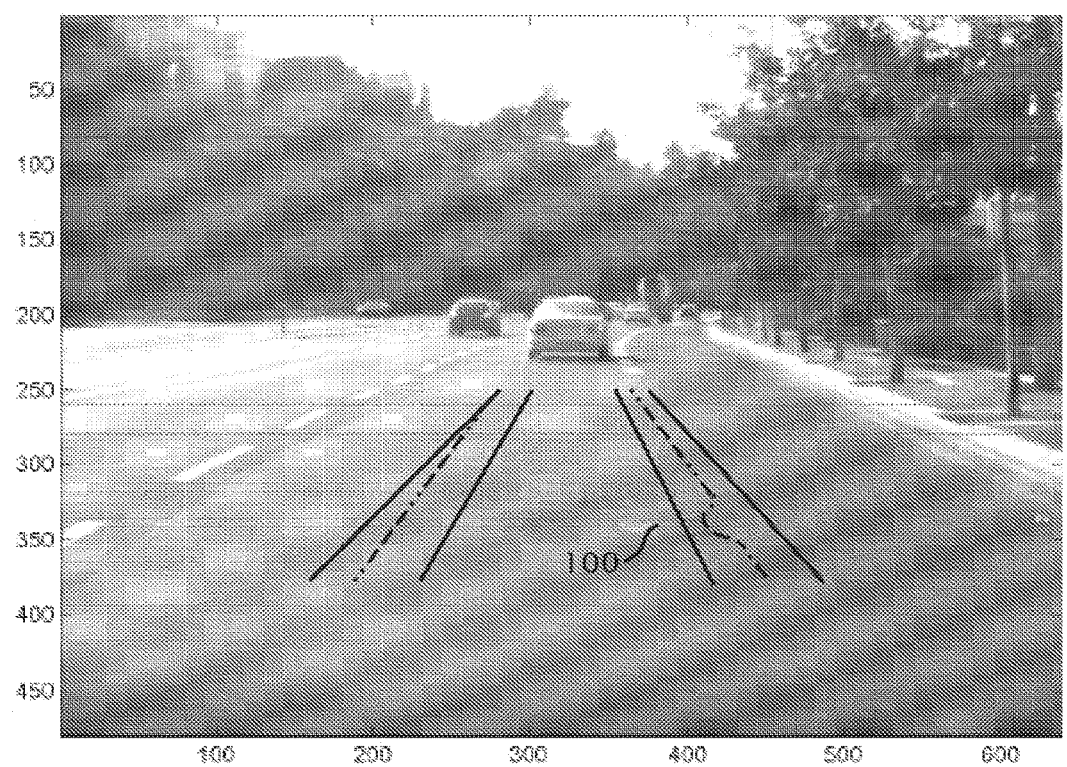
FIG. 13 shows the same data as shown in FIG. 12 overlaid on an original image, according to a feature of the present invention.

Reference is now made to FIG. 13 which shows the same data as shown in FIG. 12 overlaid on the original image 15a, according to a feature of the present invention. The solid lines indicate tracks 0.5 m wide in front of the host vehicle wheels. The dotted line is the row average of the data between each pair of solid lines.

Figure 14:
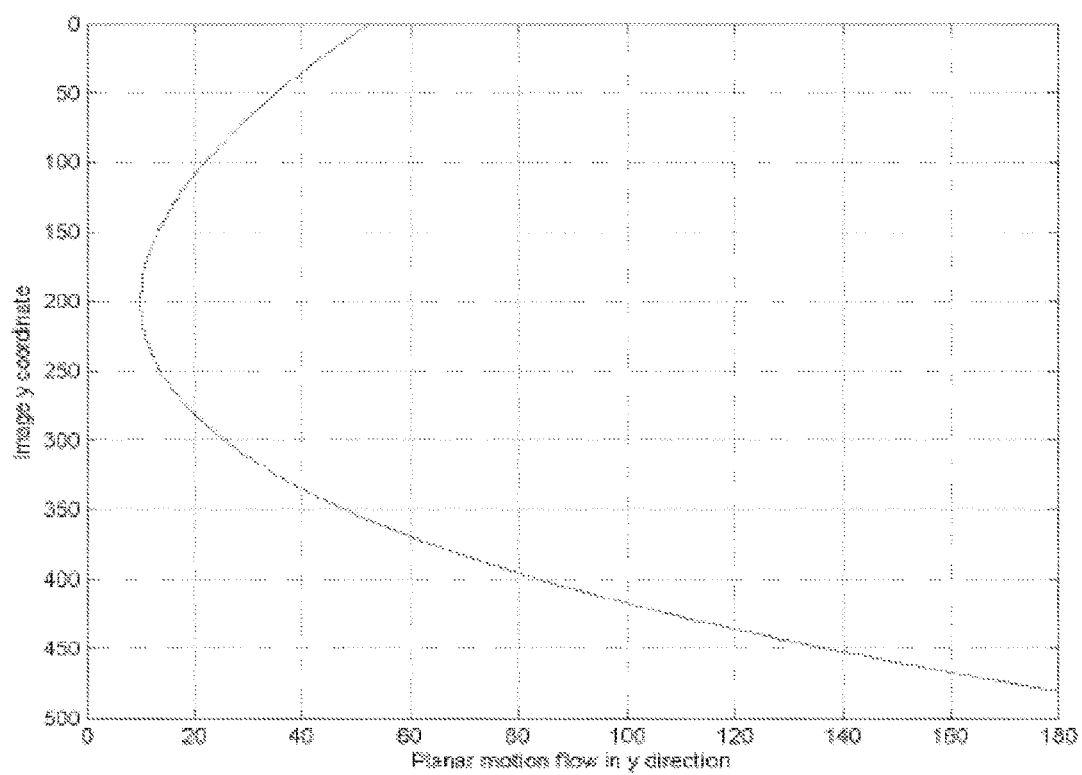
FIG. 14 which shows a graph of image y co-ordinate versus planar motion flow in the y direction, according to a feature of the present invention.

Reference is now made to FIG. 14 which shows a graph of image y co-ordinate versus planar motion flow in the y direction, according to a feature of the present invention. The same information shown in FIGS. 12 and 13 can be converted to metric values. First it is assumed that the rotation warp, initial warp and refinement warp have been combined into a single warp. With the single warp, there is now effectively a function that accurately maps points on the road from image 15a to image 15b. FIG. 14 shows the expected flow in the y direction according to the planar model. Flow has been plotted on the x axis so that the y axis aligns with the y axis of the warped image 15w.

The y coordinate of the minimum flow corresponds to $y_0$ of the image space of image 15a, in other words the horizon or vanishing point of the road in image 15a. In the case of FIG. 14, image co-ordinate y=200. The x coordinate of the minimum is the change in the value for $y_0$ between image 15a and warped image 15w. The change in the value for $y_0$ between image 15a and warped image 15w is in effect the actual pitch value in pixels. In the case shown in FIG. 14 the actual pitch value is 10 pixels.

Given $y_0$ it is easy to translate row coordinates into distance on be road plane:

$$Z = \frac{fH}{y - y_0} \quad (4)$$

The flow of the road plane due to forward motion alone (i.e. after compensating for pitch) is given by the combined warp value minus the pitch. Let v be the flow for the road plane and δv be the residual flow. Then the height of the point from the road δH is given by:

$$\delta H = \frac{\delta v}{v} H \quad (5)$$

Figure 15:
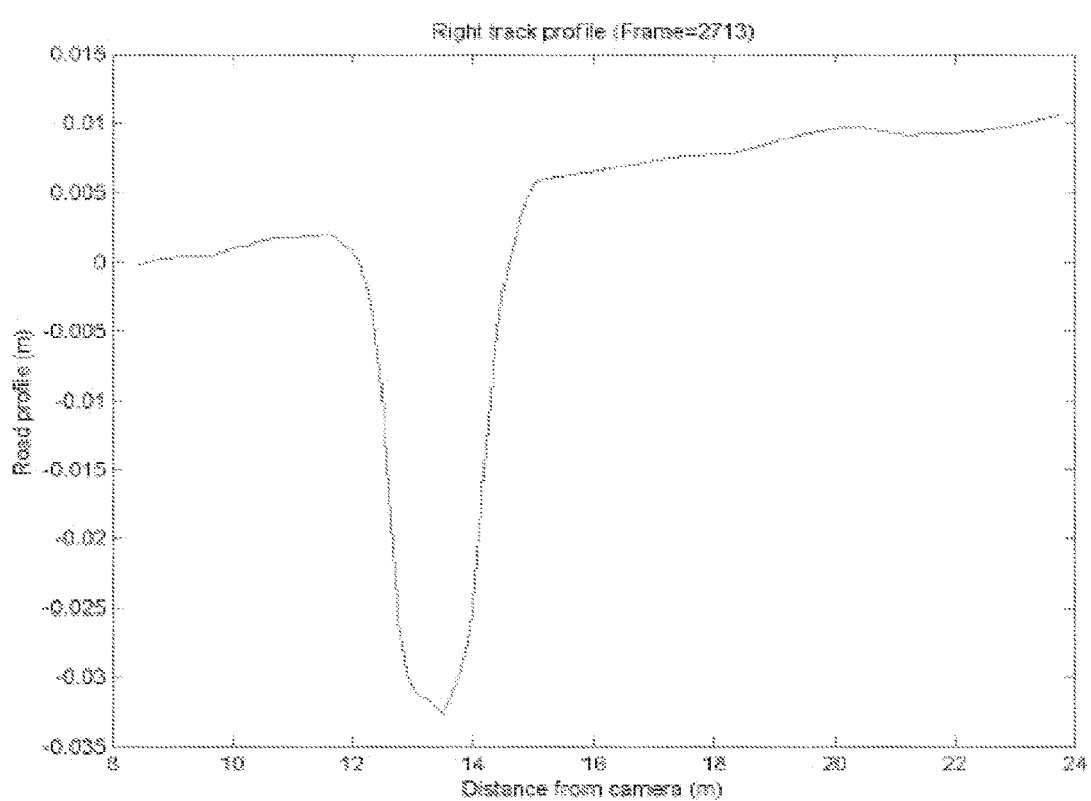
FIG. 15 shows a graph of road profile in meters versus distance from a camera in meters, according to a feature of the present invention.

Reference is now made to FIG. 15 shows a graph of road profile in meters versus distance from camera 12 in meters. FIG. 15 shows the road profile of the right hand track of FIG. 12 in metric units of distance and height.

Dynamic Programming

In the use of dynamic programming it is assumed that for a narrow track, such as a track 0.5 m wide (as shown in FIG. 13) and extending 20 m in front of one of the wheels of vehicle 18, the road surface can be modeled as a one dimensional function of the distance on the road Z.

For each point in the strip the normalized correlation may be computed in a small search region around the point to sub pixel accuracy. The normalized correlation computed in a small search region is similar to the fine resolution grid described above. However, instead of picking the highest correlation for each point as before, the average correlation score along the row is computed for each possible residual flow and robust averaging to remove outliers may used.

Next is to find a function δv as a function of y or δH as a function of Z, that maximizes the total correlation score and some smoothness score. It is also possible to add a term penalizing for deviations from the planar model.

A one dimensional optimization problem of this kind leads itself to dynamic programming. For the first row, the score for each residual flow is computed in the given range (e.g. 2 pixels). Then for each row n+1, the score associated with the average correlation score along row n+1 is computed. Also the score for each residual flow which is the best score taking into account the cumulative scores in row N and the smoothness score between this residual flow and the residual flows in row n is computed.

To be more explicit, a N×M table is set up, where N is the number of image rows in the track (for example, the 150 rows between 250 and 400) and M is the search space of residual flow. For example the 21 values: [−1:0.1:1]. The first of the N rows is simply the average correlation score given each residual flow: $S_{NC}(1, i)$ for each residual flow in the range [−1:0.1:1].

$$T(1,i) = S_{NC}(1,i) \quad (6)$$

For the general row n where n=2 to N, the value for table entry T (n, j) is a combination the average correlation score for row n for residual motion j($S_{NC}$(n, j), and the score that maximizes the combination of T(n−1, i) and the smoothness score $S_{sm}$(i, j).

$$T(n,j) = \Psi(S_{NC}(n,j), \text{Max}_i(\Phi(T(n-1,i), S_{sm}(i,j)))) \quad (7)$$

where Ψ and Φ are functions that combine the scores. A simple function could be addition. After the table has been filled one performs back-tracing to get the optimal path, which describes the surface.

Updates to the Single Frame System Computation Direction

In earlier versions the later frame was warped towards the earlier frame and the road profile was computed in the earlier frames coordinate system. A later version reverses this and warps the earlier image towards the most recent image and the road profile is computed in this most recent coordinate frame. The computation is the same but it has the following advantages:

1. Warping the earlier image towards the most recent image gives the results in the most relevant coordinate frame for the application.
2. When driving forward (the typical situation) all the road that appears in the most recent image has been viewed in the earlier images. There are no 'black' regions as appear for example in FIG. 7b.
3. It makes it easier to implement the multi-frame concept.

Picking the Frames

The current frame is picked as frame 2 and then a search back is made through the frames to find the closest previous frame where the vehicle motion was above a certain value (for example 1 m). The vehicle motion above a certain value is based on the vehicle speed and the time stamps of the frames. This frame is denoted frame 1.

Initial Motion Warp

The parameters for the initial motion warp can be determined from inertial sensors or from the images themselves or a mixture of the two. For example, in a typical modern car, the speed is available also yaw rate. Pitch rate might not be available and will be estimated from the image.

It is more convenient to implement the warps using homography matrices. That way the warps can be combined together into a single warp.

At the the initial motion warp stage, approximations can be used such as performing the yaw and pitch warps as shifts and ignore roll. The later alignment stage will correct for any affine and projective motion.

The yaw rotation between the images is based on the yaw angle theta converted into pixels. A homography matrix is then constructed to shift the image:
dTheta=dt*yawRate;
dThetaPix=f*dTheta*pi/180
dx=round(dThetaPix);
Hdx=eye(3);
Hdx(1,3)=dx;

The pitch between the images is determined from the images by tracking large patch centered on the horizon (for a high resolution 1280×960 pixel image the patch is 400 pixel wide and 200 pixel high). The patch is tracked over ±80 pixels in the vertical direction and the best match is used as the pitch value. As an alternative the region can be tessellated into sub-patches, each path tracked and a median value used. A homography matrix is then constructed to shift the image:
% find pitch and rotate around X axis(approximate as shift) based on pitch dy=findMotionY(I2,I1,y0)
Hdy=eye(3);
Hdy(2,3)=dy;

The vehicle speed, focal length and camera height are used to compute the expected road motion. The expected road motion also is a homography:
Hs1=eye(3);
Hs1(1,3)=-x0;
Hs1(2,3)=-y0;
S=dZ/(f*H);
Hs2=eye(3);
HS2(3,2)=S;
Hs3=eye(3);
Hs3(1,3)=x0;
Hs3(2,3)=y0;
Hw=Hs3*Hs2*Hs1;

The three homographies are then multiplied together to form the complete transformation:
Hall=Hw*Hdy*Hdx;
I1hw=homoWarp1(I1orig,Hall);
I1w=I1hw;

Tracking of Points and Robust Fitting

The result of the RANSAC is the correction homography H2fixed to the initial warp Hall. The correction homography H2fixed and the initial warp Hall can be multiplied together to give the accurate homography of the road plane from previous image 1 to current image 2.
H2final=Hall*H2fixed The accurate homography matrix denoted A' composed of the camera 12 motion:

$(R, \vec{T})$ and the plane normal:

$\vec{N}'$ the camera-plane distance d'π and the camera matrices K and K':

$$A' = K\left(R^{-1} + \frac{\vec{T}\vec{N}'^T}{d'_\pi}\right)K'^{-1} \qquad (8)$$

The (') is used to denote terms in the coordinate system of the second image. Since the camera matrices K and K' are the same and are known, the homography matrix A' can be broken down into its components:

$$R, \vec{N} \text{ and } \frac{\vec{T}}{d'_\pi}$$

Dense Tracking and Residual Flow

Instead of computing the dense flow over the whole image, the path of the vehicle is predicted based on yaw rate and steering angle and given the left and right wheel positions relative to the camera. For each wheel, a path of width 0.5 m for example, is projected on to the image using the parameters of the plane. For every fifth image row along this path, the path width is divided into 11 grid points which represent every 0.05 m The path width divided into 11 grid points which represent every 0.05 m, gives a well defined set of grid points along the path (of each wheel). Tracking is performed between image 2 and the warped image 1, for patches of size 17×17 or 9×9 pixels centered around each grid point. A search region of ±8 pixels in both x and y is used, including sub-pixel resolution search in the y direction. Sub-pixel resolution search in the x direction can also be performed but tests did not show improved performance and sub-pixel resolution search in the x direction increases computation time. As an optimization, the search region for each pixel can be optimized based on each pixel position in the image and the location of the focus of expansion (FOE), since the flow is expected only on lines passing through the FOE.

An alternative optimization would be to rectify the images so that the FOE is mapped to infinity, the viewpoint is mapped to an overhead view point and the flow becomes vertical. The alternative optimization is very similar to rectification in two camera stereo systems. However, given that the transformation on the image is quite different for different distances along the road, it would be advantageous to perform the rectification separately for horizontal strips in the image. For each strip there would be one row where the width does hot change significantly. Row above the one row would extend and rows below would shorten. For example, for a road region of 5 m to 20 m one can warp one strip 5 m to 10 m centered around 7 m. A second strip can be 8 m to 16 m centered around 11 m and a third strip can be from 14 m to 22 m centered around 17 m.

The strips would not extend the whole width of the image but only wide enough to cover the wheel tracks with a margin to allow for the patch size.

For each point a validity bit is set based on forward-backward verification, a minimal correlation value and thresholds on allowed x and y flow values. For each row, the median of the valid points out of the 11 points along the row is taken as the value for that row. The number of valid points along the row is a confidence value. For a row with no valid points a residual flow value is interpolated from valid neighbor points above and below.

A further smoothing step can be used. For example, a median filter of width three can be used followed by a averaging filter of width three. This gives the residual flow: $\vec{\mu}$ which is known to be:

$$\vec{\mu} = \frac{H}{Z} \frac{T_z}{d_\pi^r} (\vec{e} - \vec{p}_w) \quad (9)$$

where H is the height of the point from the reference frame. Given the residual flow for each point along the path the equation can be solved for H.

While it is convenient to perform the fine tracking in pixel and sub pixel resolution it is also possible to define the search areas in terms of height above or below the plane. For example instead of a search from −2 pixels to 2 pixels with subpixel resolution at 0.1 pixel accuracy, it is possible to search for a height between −0.2 m and 0.2 m at 0.01 m increments. A search for a height of between −0.2 m and 0.2 m at 0.01 m increments requires translating the height to a pixel shift and performing the normalized cross correlation. The search is more expensive but allows imposing metric smoothness constraints in the initial cost function.

The search can also allow a method for combining information from three or more motions. Consider a sequence of three frames 1, 2 and 3.
1. Warp frames 1 and 3 towards frame 2.
2. Track points and keep valid points that tracked well from 1 to 2 and 3 to 2.
3. Perform RANSAC, picking 4 points from image 2 and computing homographies from images 1 and 3. However the inlier count is the minimum of inliers from the mapping 1 to 2 and to 2.
4. Compute final homographies from 1 to 2 and 3 to 2 and warp images.
5. For points along the wheel tracks, perform a search for best height from the reference plane. For each height compute the residual pixel motion from 2 to 1 and from 2 to 3 separately, compute the normalized correlation scores separately and average (or minimum or maximum). Alternatively one can compute a combined normalized correlation score.
6. Pick best score.

Multi-Frame Analysis

The system can detect shape features and humps that are a few centimeters high at distance of greater than 10 m. Naturally there is also some noise in the system and spurious bumps are detected. However real shape features will move consistently with the movement of the vehicle, while spurious shape features due to noise will appear randomly or might be stationary in the image if they are due to imaging artifacts. Shape features due to moving objects will also not move consistently with the vehicle.

It is therefore, useful to accumulate information over time. One method would be to use plane information and the road profile information to create a road profile in 3D (X,Y,Z) coordinates and then use the ego motion of the vehicle to transform the model from frame to frame. A Kalman filter could be used.

Another method uses the homography itself to carry information from frame to frame over time. Using the homography itself to carry information from frame to frame over time takes advantage of the fact the the road profile is defined on a road surface and the actual deviations due to the shape features are within 1 or 2 pixels, much smaller than the size of the surface regions or patches are being considered. The basic multi-frame algorithm is as follows:
1. Assume a multi-frame road profile has been computed for frame n−m, where m is often equal 1 but might be larger if computing a profile for each frame is not required.
2. Compute the single frame road profile for frame n using frame n and frame n−k where k might not be equal to m. Typically k is chosen so that the vehicle motion is above a certain value such as one meter.
3. The multi-frame profile and the single plane profile use different reference planes. The different reference planes are often very similar since they are determined by the same road with significant areas of overlap but when passing over a speed bump the assumption that the reference frames are very similar breaks down. It is therefore important to compensate for passing over a speed bump by:
   (a) Let $\pi_m$ be the reference plane of the multi-frame model and let $\pi_n$ be the reference plane of the single frame model.
   (b) For each point along the vehicle path (x, y), compute the corresponding (X, Y, Z) point on the plane $\pi_m$. Then compute the distance from the point (X, Y, Z) to the plane $\pi_n$.
   (c) The distance from the point (X, Y, Z) to the plane $\pi_n$ is added to the road profile for that point along the path.
4. Compute the homography matrix ($H_{nm}$) of the road between n and n−m (if m=k we can reuse the results).
5. Use the inverse of $H_{nm}$ to transform the path coordinates (x1, y1) from frame n−m to frame n, which gives the path from frame n−m in in the coordinates of frame n, ($x1_h$, $y1_h$).
   p1=[x1,y1,ones(size(y1))];
   p2=p1*inv(Hnm)';
   p2=[p2(:,1)./p2(:,3),(:,2)./p2(:,3),p2(:,3)./p2(:,3)];
   x1h=p2(:,1);
   y1h=p2(:,2);
6. Interpolate the values of the multi-frame road profile ($ProjL_1$) and confidence values ($VS_1$) to the coordinates of the path of frame n, (x2,y2):
   ProfL_1Interp=interp1(y1h,Prof_1,y2,'linear','extrap')';
   VS_1Interp=interp1(y1h,VS_1,y2,'linear','extrap')!;

In the above code it is assumed that only small lateral changes in the path. If large lateral changes are expected then it is possible to reduce the multi-frame confidence at point (i) by a function of the difference (x1h(i)−x2(i)).

7. The new multi-frame profile is a weighted average between the warped multi-frame profile and the current single frame profile:

ProfL_1=(a*VS.*ProfL+(1−a)
*VS_1Interp.*ProfL_1Interp)./(a*VS+(1−a)*VS_1Interp);

Weighting is based on the confidence scores and a time factor (a). Note that this Matlab code. ProfL_1, VS, ProfL, VS_1Interp and ProfL_1Interp are all vectors and that the weighted average is performed for each element along the vector ProfL_1.

8. The multi-frame confidence is also computed:

VS_1=max(1,(a*VS+(1−a)*VS_1Interp));

Note that the single frame confidence value (VS) as defined is a vector of numbers between zero and 11 (assuming a path of width 0.5 m sampled every 0.05 m). The max function ensures that the multi-frame confidence is non zero for every point in the vector.

Although embodiments of the present invention are presented in the context of driver assistance applications, embodiments of the present invention may be equally applicable in other real time signal processing applications and/or digital processing applications, such as communications, machine vision, audio and/or speech processing as examples.

The indefinite articles "a", "an" is used herein, such as "an image" has the meaning of "one or more" that is "one or more images".

Although selected features of the present invention have been shown and described, it is to be understood the present invention is not limited to the described features. Instead, it is to be appreciated that changes may be made to these features without departing from the principles and spirit of the invention, the scope of which is defined by the claims and the equivalents thereof.

What is claimed:

1. A method for detecting a deviation in a vertical contour of a road, the method comprising:
    receiving, from a camera, a first image of the road and a second image of the road;
    estimating an optical flow based on the first image and the second image;
    and
    determining the deviation in the vertical contour of the road based on the optical flow and a road surface model.

2. A system for detecting a deviation in a vertical contour of a road, the system comprising:
    at least one processor programmed to:
    receive, from a camera, a first image of the road and a second image of the road;
    estimate an optical flow based on the first image and the second image;
    and
    determine the deviation in the vertical contour of the road based on the optical flow and a road surface model.

3. The method of claim 1, wherein estimating the optical flow based on the first image and the second image includes warping the second image toward the first image.

4. The method of claim 3, further comprising tracking image points of the road in the first image and corresponding image points of the road in the warped second image.

5. The method of claim 4, further comprising selecting a grid of a plurality of image points in the first image prior to tracking the image points of the road in the first image and corresponding image points of the road in the warped second image.

6. The method of claim 1, wherein determining the deviation in the vertical contour of the road comprises comparing the estimated optical flow with an optical flow predicted by the road surface model.

7. The method of claim 1, wherein the camera is mounted in a vehicle, and the first image and the second image are captured by the camera while the vehicle is moving.

8. The method of claim 1, wherein the road surface model includes a planar road surface model or a bi-quadratic road surface model.

9. The method of claim 1, wherein the first image and the second image are consecutively captured by the camera.

10. The system of claim 2, wherein the at least one processor is further programmed to estimate the optical flow by warping the second image toward the first image.

11. The system of claim 10, wherein the at least one processor is further programmed to track image points of the road in the first image and corresponding image points of the road in the warped second image.

12. The system of claim 11, wherein the at least one processor is further programmed to select a grid of a plurality of image points in the first image prior to tracking the image points of the road in the first image and corresponding image points of the road in the warped second image.

13. The system of claim 2, wherein the at least one processor is further programmed to determine the deviation in the vertical contour of the road by comparing the estimated optical flow with an optical flow predicted by the road surface model.

14. The system of claim 2, wherein the camera is mounted in a vehicle, and the first image and the second image are captured by the camera while the vehicle is moving.

15. The system of claim 2, wherein the road surface model includes a planar road surface model or a bi-quadratic road surface model.

16. The system of claim 2, wherein the first image and the second image are consecutively captured by the camera.

* * * * *